US012456073B2

(12) United States Patent
Ferreira et al.

(10) Patent No.: US 12,456,073 B2
(45) Date of Patent: Oct. 28, 2025

(54) ADAPTABLE DATASET DISTILLATION FOR HETEROGENEOUS ENVIRONMENTS

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1044 days.

(21) Appl. No.: 17/451,608

(22) Filed: Oct. 20, 2021

(65) Prior Publication Data

US 2023/0122139 A1   Apr. 20, 2023

(51) Int. Cl.
*G06N 20/00* (2019.01)
(52) U.S. Cl.
CPC .................................... *G06N 20/00* (2019.01)
(58) Field of Classification Search
CPC ........... G06N 20/00; G06N 3/09; G06N 3/098
See application file for complete search history.

(56) References Cited

U.S. PATENT DOCUMENTS

2020/0302292 A1*  9/2020  Tseng .................. G06N 3/10

OTHER PUBLICATIONS

Asad et al., "Evaluating the Communication Efficiency in Federated Learning Algorithms", 2021, 2021 IEEE 24th International Conference on Computer Supported Cooperative Work in Design (CSCWD), vol. 24 (2021), pp. 552-557 (Year: 2021).*
Nilsson et al., "A Performance Evaluation of Federated Learning Algorithms", 2018, DIDL '18: Proceedings of the Second Workshop on Distributed Infrastructures for Deep Learning, vol. 2018, pp. 1-8 (Year: 2018).*
Zhou et al., "Distilled One-Shot Federated Learning", Jun. 6, 2021, arXiv, v3, pp. 1-16 (Year: 2021).*
Sucholutsky et al., "Soft-Label Dataset Distillation and Text Dataset Distillation", Jul. 22, 2021, 2021 International Joint Conference on Neural Networks (IJCNN), vol. 2021, pp. 1-8 (Year: 2021).*
Zhao et al., "Dataset Condensation with Gradient Matching", Mar. 8, 2021, arXiv, v3, pp. 1-20 (Year: 2021).*
Yufeng, "The 7 Steps of Machine Learning", 2017, retrieved from https://towardsdatascience.com/the-7-steps-of-machine-learning-2877d7e5548e on Oct. 21, 2024 (Year: 2017).*
Goetz et al., "Federated Learning via Synthetic Data", 2020, arXiv, v2, pp. 1-12 (Year: 2020).*
Chennupati et al., "Adaptive Distillation: Aggregating Knowledge from Multiple Paths for Efficient Distillation", Oct. 19, 2021, v1, pp. 1-14 (Year: 2021).*

(Continued)

*Primary Examiner* — Leonard A Sieger
(74) *Attorney, Agent, or Firm* — Workman Nydegger

(57) ABSTRACT

One example method includes mapping of a set of environment constraints to various elements of a dataset distillation process, and then performing the dataset distillation process based upon the mapping, and the dataset distillation process is performed in a distributed manner by a group of edge nodes and a central node with which the edge nodes communicate. The environment constraints may include computing resource availability, and privacy constraints concerning the data of the dataset.

18 Claims, 9 Drawing Sheets

(56) References Cited

OTHER PUBLICATIONS

Hao et al., "Towards Fair Federated Learning with Zero-Shot Data Augmentation", Jun. 25, 2021, Proceedings of the IEEE/CVF conference on computer vision and pattern recognition, vol. 2021, pp. 3310-3319 (Year: 2021).*
Zhou et al., "Distilled One-Shot Federated Learing", Jun. 6, 2021, arXiv, v3, pp. 1-16 (Year: 2021).*
Sucholutsky et al., "Soft-Label Dataset Distillation and Text Dataset Distillation", Jul. 11, 2021, 2021 International Joint Conference on Neural Networks (IJCNN), vol. 2021, pp. 1-8 (Year: 2021).*
T- Wang, J. Zhu, A. Torralba and A. Efros, "Dataset distillation," arXiv, vol. preprint arXiv:1811.10959, 2018.
Daliang Li, Junpu Wang, "FedMD: Heterogenous Federated Learning via Model Distillation", Oct. 8, 2019, arXiv:1910.03581 [cs. LG], NeurIPS 2019 Workshop on Federated Learning for Data Privacy and Confidentiality.

* cited by examiner

```
1.  # Dataset Distillation
2.  M: Number of elements in distilled dataset
3.  D: Dimensionality of distilled dataset
4.  α: step size
5.  η̃: learning rate
6.  x̃ ← init_distilled_data(M, D)
7.  for t = 1 to T do
8.      x ~ p(X)
9.      for i = i to I
10.         θ_i ~ p(θ)
11.         for e = 1 to E do
12.             θ_i ← -η̃∇_{θ_i} ℓ(x̃,θ_i)
13.             L_i ← ℓ(x,θ_i)
14.         x̃ ← x̃ - α Σ_i ∇_x̃ L_i
15.         η̃ ← η̃ - α Σ_i ∇_η̃ L_i
16.     return x̃, η̃
```

| Algorithm step | Data required |
|---|---|
| Distilled dataset initialization | $M$ : Intended number of elements in distilled dataset<br>$D$ : Intended dimensionality of distilled dataset |
| Model optimization | $I$ : Number of sampled models<br>$E$ : Number of model optimization epochs<br>$p(\theta)$ : Model distribution for initialization<br>$\tilde{x}$ : Distilled dataset |
| Loss Evaluation | $x$ : Real data<br>$\tilde{x}$ : Distilled dataset<br>$\theta_i$ : Optimized model |
| Gradient Computation | $\tilde{x}$ : Distilled dataset<br>$\tilde{\eta}$ : Distillation learning rate<br>$\nabla_{\tilde{x}} L_i$ : Real data<br>$\nabla_{\tilde{\eta}} L_i$ : Optimized model |

FIG. 5

```
1.   # Federated Dataset Distillation
2.   # Model optimization:           Edge
3.   # Distillation loss computation: Edge
4.   # Distillation Step:            Central
5.   M: Number of elements in distilled dataset
6.   D: Dimensionality of distilled dataset
7.   α: step size
8.   $\tilde{\eta}$: learning rate
9.   $\tilde{x}$ ← init_distilled_data(M)
10.      for t = 1 to T do
11.          communicate $\tilde{x}, \tilde{\eta}, p(\theta)$ to each edge node
12.      At each edge node i do
13.          $x_i \sim p(X_i)$
14.          $\theta_i \sim p(\theta)$
15.          for e = 1 to E do
16.              $\theta_i \leftarrow -\tilde{\eta} \nabla_{\theta_i} \ell(\tilde{x}, \theta_i)$
17.          $L_i \leftarrow \ell(x_i, \theta_i)$
18.          $\nabla_{\tilde{x}} L_i, \nabla_{\tilde{\eta}} L_i \leftarrow$ get_compressed_grad $(x_i, \ell(\tilde{x}, \theta_i))$
19.          communicate $\nabla_{\tilde{x}} L_i, \nabla_{\tilde{\eta}} L_i$ to central node
20.      $\nabla_{\tilde{x}} L_i, \nabla_{\tilde{x}} L_i \leftarrow$ decompress_grad $(\nabla_{\tilde{x}} L_i, \nabla_{\tilde{\eta}} L_i)$
21.      $\tilde{x} \leftarrow \tilde{x} - \alpha \sum_i \nabla_{\tilde{x}} L_i$
22.      $\tilde{\eta} \leftarrow \tilde{\eta} - \alpha \sum_i \nabla_{\tilde{\eta}} L_i$
```

FIG. 6

```
1.   # Distributed Dataset Distillation
2.   # Model optimization:              Central
3.   # Loss computation:                Edge
4.   # Distillation optimization:       Central
5.   α: step size
6.   η̃: learning rate
7.   x̃ ← init_distilled_data()
8.   for t = 1 to T do
9.       for i = 1 to I do
10.          θ^(i) ~ p(θ)
11.          for e = 1 to E do
12.              θ^(i) ← -η̃∇_{θ^(i)} ℓ(x̃, θ^(i))
13.          communicate x̃, η̃, θ^(i) to each edge node i
14.          At each edge node i do
15.              x_i ~ p(X_i)
16.              for j = 1 to J do
17.                  L_i^j ← ℓ(x_i, θ^(i))
18.              communicate ∇_x̃ L_i, ∇_η̃ L_i to central node
19.       x̃ ← x̃ - α Σ_i ∇_x̃ L_i
20.       η̃ ← η̃ - α Σ_i ∇_η̃ L_i
```

FIG. 9

ADAPTABLE DATASET DISTILLATION FOR HETEROGENEOUS ENVIRONMENTS

FIELD OF THE INVENTION

Embodiments of the present invention generally relate to edge computing. More particularly, at least some embodiments of the invention relate to systems, hardware, software, computer-readable media, and methods for distillation of datasets that may be used for the training of machine learning (ML) models deployed in edge computing environments. The locations where dataset distillation is performed may be determined based on various restrictions relating to the environment.

BACKGROUND

To address latency and other concerns, computing workloads, including the training of ML models, are increasingly being pushed out to edge computing environments for execution. However, problems have arisen, particularly with respect to scenarios in which the scale of the edge environment, which may comprise millions of nodes for example, is quite large, and in which privacy constraints restrict the type and range of possible approaches to performing the computing workloads. For example, some ML training models may need access to a significant part of all the data available at the edge nodes in order to pre-train an ML model to be deployed and fine-tuned at each edge node. As discussed below, there are a number of challenges involved with obtaining the necessary data, and using that data to train ML models. In brief, such challenges include a limited processing capability at the nodes to train ML models, limited storage capacity at the nodes to store a history of data streams, and data sharing restrictions implicated by privacy or compliance issues, communication costs, and/or data scalability.

With regard to computational, or processing, limitations, some of the edge nodes might have limited computational capability, especially in with regard to training ML models. For instance, most of the current successful models require the use of GPUs to train the models or to perform any other form of model optimization, such as dataset distillation. Further, even if optimization were performed on CPUs, the process would still incur the problems of energy and time cost restrictions.

The lack of storage capacity at edge nodes presents some particular problems. For example, and in addition to process optimization restrictions such as those just noted, there may be data storage limitation due to cost, size, or context on which the node is operating. Lack of adequate storage may represent a significant limitation since it may be desirable to store data streams at each node in order to keep the datasets up to date, to thereby enable training of the ML models with up-to-date data. Obtaining a representative initial ML model, however, requires the storage of a common dataset, with samples drawn from a sufficiently representative number of nodes. Furthermore, each edge node senses a private data stream, and typically no data sharing between or among nodes is allowed due to privacy and compliance issues. As well, these streams comprise a large volume of data over long periods of time, such that storing historical data at the edge node is challenging in itself. This is particularly problematic in scenarios where there is a constant data stream at each edge node and where newly added edge nodes would greatly benefit from being trained on the large and diverse data from all other edge nodes. The problem, however, is that storing all of these data streams at the edge, or near the edge, is typically unfeasible. A related concern is that storing the data at, or near, the edge might incur significant extra costs for storage and maintenance of large datasets. As the aforementioned examples thus illustrate, it may be difficult, or impossible, to obtain, and then maintain, a feasible representative dataset that reduces costs but still allows for the effective training of ML models to be deployed to edge nodes.

Finally, data communication restrictions may impair the ability to obtain data needed for effective training of ML models. For example, there may be a need to avoid transmitting the data from the edge nodes. Such restrictions on data transfer may be desirable, and are sometimes required, due to the privacy of the data. Each edge node senses its own data stream, with a particular distribution, and these data must not be shared outside of the node. Another reason for avoiding the transmission of data from edge nodes is the significant communication costs imposed by that transmission. This is of particular concern in environments with a large number of edge nodes. The huge volume of their combined data streams, such as, for example, respective video feeds from each one of millions of smart vehicles, would make the communication to a central node impractical, or even impossible. Even if such data transmission were possible, the complete historical data of all nodes would likely amount to impractical volumes of data to be stored at a central node.

While this data may, instead, be stored at the edge nodes, the edge nodes may individually and collectively lack the required amount of long-term data storage. To illustrate, an intelligent vehicle may not have storage capable of keeping the historical information, such as a video stream for example, collected by the vehicle over a long enough period such as years. However, discarding some of the data, in an attempt to ensure that data storage capabilities of the node would not be overtaxed, would require a process to determine whether the data is important or not for the purposes of training a model that can generalize the experiences of that node.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 5 discloses a table with elements and data that may be employed in a federated data set distillation process.

FIG. 6 discloses an example algorithm for a federated dataset distillation process.

FIG. 9 discloses an algorithm for distributed dataset distillation.

DETAILED DESCRIPTION OF SOME EXAMPLE EMBODIMENTS

Figures 1, 2:
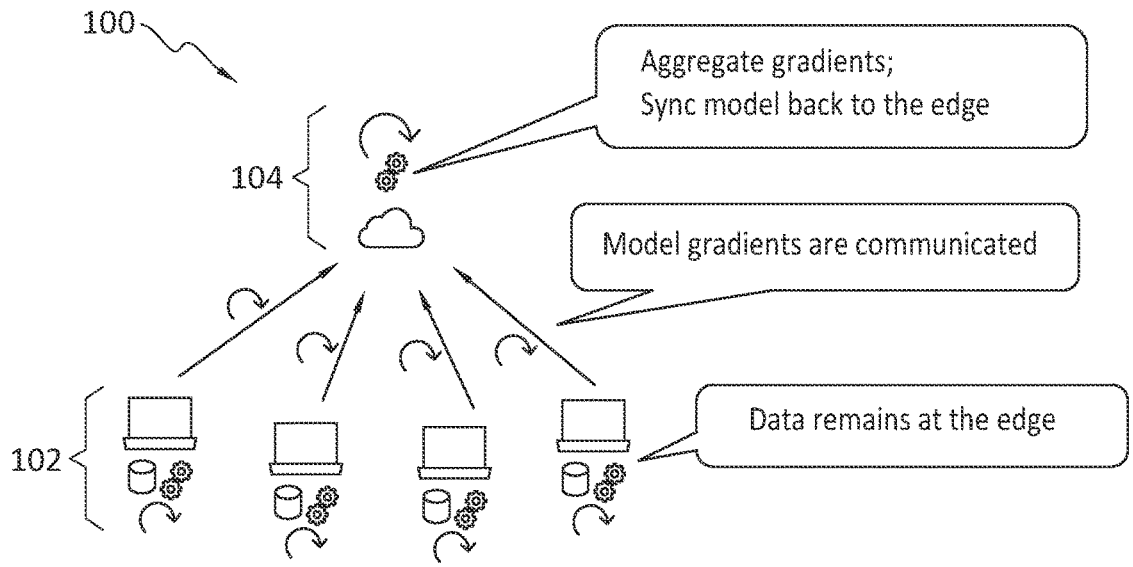
FIG. 1 discloses a federated learning overview.
FIG. 2 discloses an example algorithm for dataset distillation.

Embodiments of the present invention generally relate to edge computing. More particularly, at least some embodiments of the invention relate to systems, hardware, software, computer-readable media, and methods for distillation of datasets that may be used for the training of machine learning (ML) models deployed in edge computing environments. The locations where dataset distillation is performed may be determined based on various restrictions relating to the environment.

In general, example embodiments of the invention may involve a decision process that may map a dataset distillation process to various criteria such as, for example, data privacy considerations, and resource availability. As a result of this mapping, various operations of the distillation process may be assigned to be performed, and then performed, at a central node and one or more edge nodes configured for communication with the central node.

An example of such a dataset distillation process, whose performance may be distributed amongst a central node and one or more edge nodes, includes initializing a distilled dataset, and choosing a size and dimensionality of the dataset. The next part of the distillation process may comprise a model optimization which may begin with one or more initialized models that are then optimized on the current distilled dataset. The result of this optimization may be a model trained on the distilled data. This model may then be used in the next part of the distillation process, namely, a distillation loss computation on the real data. After computing the distillation loss, the distilled dataset may be optimized by performing a process with the aggregated distillation losses from each optimized model. As well, the distillation process may perform a process learn a learning rate for the model. The distillation loss and learning rate gradient steps may be performed using one or more gradients. The distillation process operations may be performed in closed loop for a given number of iterations.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an advantageous aspect of at least some embodiments of the invention is that embodiments may provide for performance of a dataset distillation process in an effective and efficient manner at a group of nodes, while remaining sensitive to privacy and other concerns, and in view of resource and other constraints at the nodes. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

The world is entering an era of distributed Machine Learning (ML) model training and inference at edge computing environments and, for some applications, models are increasingly data hungry. Such models include, for example, Natural Language Processing (NLP) and Computer Vision. Whatever the application, strategies to train and deploy ML models to a larger number of edge nodes are required.

In a distributed edge scenario that may include multiple edge nodes arranged for communication with each other and with a central node, each edge node is dealing with its own data stream, with a particular distribution, and might benefit from models fine-tuned to perform well for it. As new edge nodes are added dynamically to the network, or edge computing environment, the near edge computing environment needs to decide which ML model to employ, and how to deploy the models to the edge. Since data are constantly shifting and new edge nodes are added dynamically, a protocol for efficiently deploying pre-trained models to the new edge nodes may cut down on cost and time. Pre-trained models may efficiently achieve production performance after fine-tuning on the data arriving for a given edge node, which may provide significant speed-up in deployment.

In some instances, it may be useful for the edge nodes to share the same model family, though not necessarily the same model, for a common task such as self-driving of autonomous vehicles or the operation of surveillance cameras, while adapting the model to its own data, that is, the input stream received by the edge node and provided to the model. More concretely, it may be useful for new edge nodes to receive pre-trained models that the edge nodes can fine tune using their own data. Pre-trained models may be deployed to the edge and then efficiently achieve high production performance after fine-tuning on the data arriving for each given edge node.

In order to deploy models to the edge in the manner noted above, an approach would have to be identified for efficiently pre-training a new model. Obtaining a representative initial model, however, may require the storage of a common dataset, with samples drawn from a sufficiently representative number of nodes. Another related matter is that each model at the edge might be sensing its own data stream, which can be sensitive or require non-sharing due to privacy and compliance issues relating to that data.

Among other things then, example embodiments of the invention are concerned with distributed environments, in which a model may need to be aligned and up to date with the combined historical data of the nodes in order to be able to generalize to future data, and to new nodes where the model is, or will be, deployed. If done automatically, such model deployment could be offered as-a-service (aaS). Various challenges may be presented however, including, a limited process capability at the nodes to train ML models, limited data storage capacity at the nodes to store a history of data streams received and/or generated by the nodes, and data sharing restrictions such as privacy or compliance issues, communication costs, and data scalability.

A dataset distillation process, in which a model may be pre-trained to high accuracy using only a small amount of data, may be employed in example embodiments. For some data distillation processes, such data might not need to come from the same distribution as the original data. In some instances, data distillation processes may provide a reduction on the order of up to 1000× less data, relative to approaches that do not employ data distillation, needed to train a model quickly so that the model results exhibit a reasonably low error.

Example embodiments may use a catalogue of context restrictions and tradeoffs mapping to different data set distillation algorithms in order to provide a decision support system for model deployment in distributed environments. More particularly, example embodiments of the invention may provide such a mapping of context, such as environment restrictions and trade-offs, to methods and protocols that aim at efficiently deploying models to edge nodes with dataset distillation. Thus, example embodiments may implement, among other things, functionalities including (i) a decision support system in the form of a catalogue mapping environment restrictions and trade-offs to different dataset distillation methods and protocols, and (ii) data set distillation algorithms pertinent to various use cases.

B. Background

Following is a discussion of various concepts which may be employed in example embodiments of the invention.

B.1. Federated Learning

In Federated Learning (FL) approaches, the model training task may be performed by keeping data at each edge node, training the ML model locally at the node, and then communicating model updates, also referred to as gradients, to a central node that will perform an aggregate update from many nodes. The aggregation results in an updated model that may then be synced back to all the nodes. FIG. 1 discloses an overview of an example federated learning configuration 100. A simplified, but not limiting, example of the operations that may be involved in the training of a Deep Neural Network (DNN) in an FL setting, as shown in FIG. 1, may involve the following operations and iterations: (1) the client, or edge, nodes 102 download the current model from the central node 104—if it is the first cycle, the shared model may be randomly initialized at the edge nodes 102; (2) each client node 102 may then train its respective local instance of the model using its local data, that is, the local data of the node, during a user-defined number of epochs; (3) the model updates, or gradients, may be sent from the client nodes 102 to the central node(s) 104—these updates may be vectors containing the gradients; (4) the central node 104 may then aggregate these vectors, update the model, and then sync the shared model back to the nodes 102—one way of aggregating vectors is through a simple averaging process (Federated Average). If a predefined number of cycles N is reached, the training may finish, otherwise, the process may return to (1) again.

Note that FL processes may also consider a security layer around communication. Further, FL may provides strong privacy-preserving guarantees since datasets may never be communicated between nodes, which, in turn, reduces network communication by a significant fraction since there is no need to transfer data. Additional gradient compression techniques may be used to further reduce network costs. Thus, data privacy may be gained at the cost of the trade-off between compression and generalization in model update communication. Another consideration is the need for a security layer when transmitting and aggregating gradients in order to avoid statistical leaks of information or possible attacks. Thus, example embodiments may operate in connection with a general FL framework over which distributed dataset distillation operations may be performed.

B.2 Dataset Distillation

In general, dataset distillation may be considered as seeking an answer to the question: What would be a small synthetic dataset that, when used to train a model, would yield low error? Thus, an aim of dataset distillation is to obtain a dataset small enough to be manageable, such as in terms of resource consumption for example, but suitably representative of an overall dataset as to provide acceptable results when used to train a model. Thus, embodiments of the invention may not be particularly concerned simply with the size of a sample of the dataset, nor necessarily with a compression of the full dataset. Rather, example embodiments may be more focused on the notion of building a sketch, that is, a distilled dataset, of the data in order to approximate a function, or model.

In some embodiments, a distilled dataset may obtained through a double optimization process, which may begin with a synthetic random dataset, such as white noise images for example, and then optimize a model with a known real dataset and calculate a loss on the current synthetic dataset. Next, such embodiments may then optimize with respect to the synthetic dataset on that calculated loss. Embodiments may sample many different models in this optimization process in order to obtain a distilled dataset that is robust and able to effectively handle in-distribution changes to a family of models.

Figure 3:
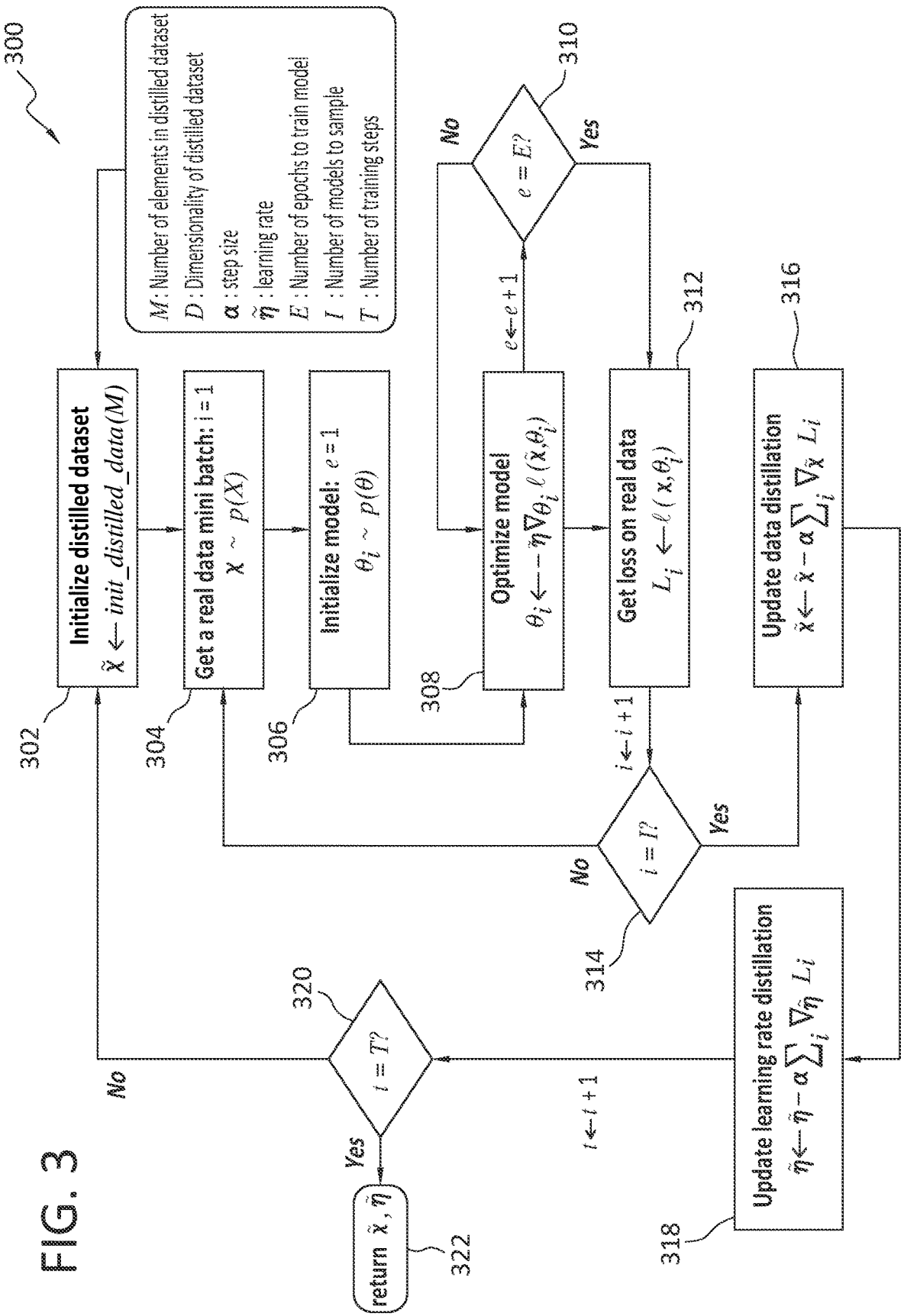
FIG. 3 discloses a flow chart view of the FIG. 2 algorithm for dataset distillation.

An example algorithm 200 for dataset distillation is disclosed in FIG. 2, and an example method 300, corresponding to the algorithm 200, is disclosed in FIG. 3. As shown in FIG. 3, the method 300 may begin at 302 with initialization of a distilled dataset. Next, a real data mini batch may be obtained 304 from the distilled dataset. The ML model may then be initialized 306, and an epoch counter started at 1. A model optimization 308 may then be performed, and a check 310 performed to determine if the number of epochs needed to train the model has been reached. If not, the method may return to 308. On the other hand, if the requisite number of epochs has been reached, the method 300 may advance to 312 where a loss of the model on real data is obtained, and a number of models to be sampled is incremented by one. At 314, a check may be performed to determine if a specified number of models has been sampled. If not, the method 300 may return to 304. On the other hand, if the specified number of models has been sampled, the data distillation may be updated 316. After the update 316 to the data distillation, the learning rate distillation may be updated 318. Finally, when the learning rate distillation has been updated 318, a check 320 may be performed to determine if the number of training steps meets an established threshold. If not, the method 300 may return to 302. If the number of training steps does meet the threshold, the method 300 may terminate at 322 by returning a distilled data set, and learning rate.

B.3 Federated Dataset Distillation

Figure 4:
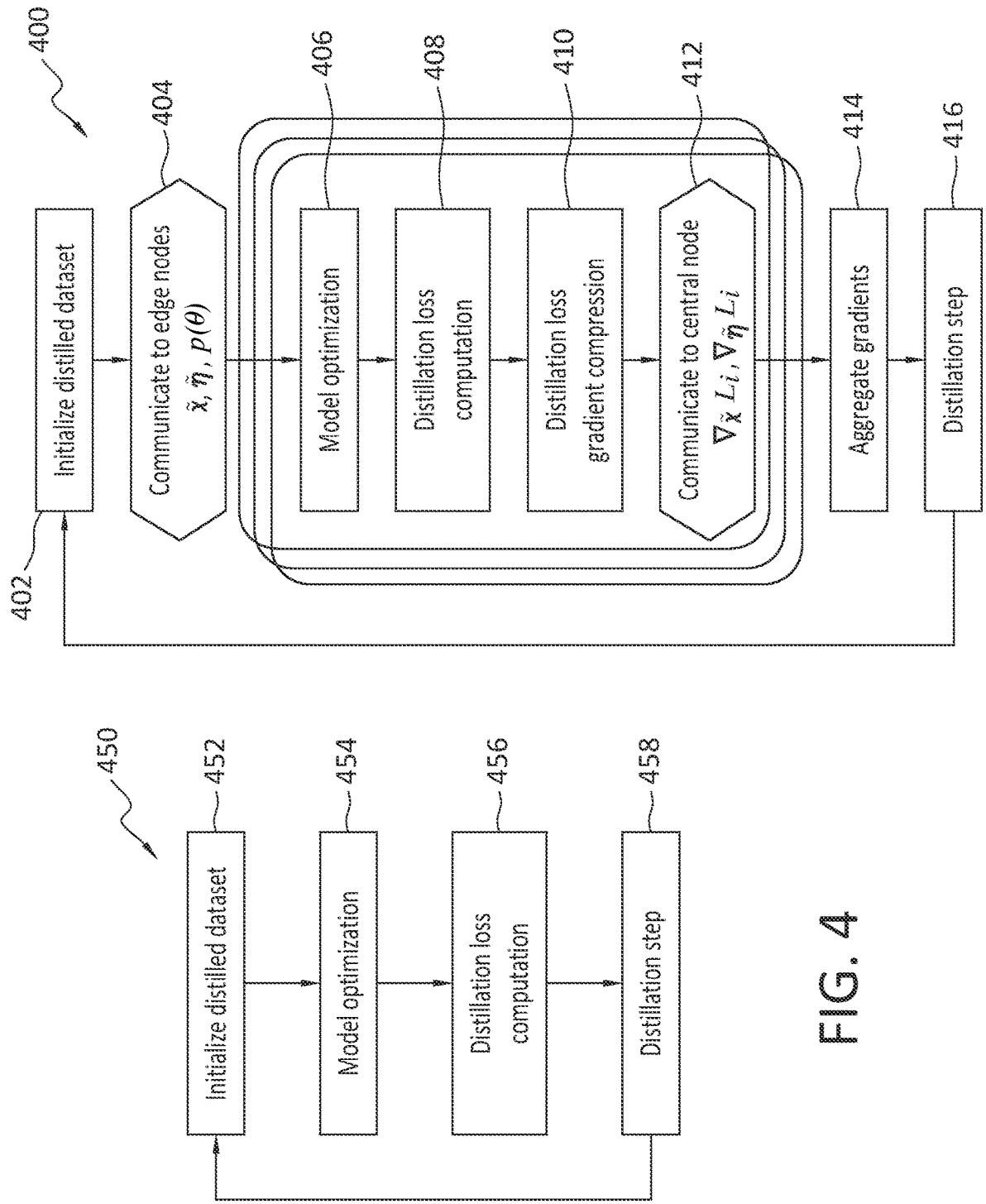
FIG. 4 discloses an example flow chart for a conventional data distillation process (left), and a federated data distillation process (right).

The following discussion concerns an example method for performing dataset distillation in a privacy-preserving, efficient communication, scenario. A high-level comparison between an example federated algorithm 400 for dataset distillation, and a conventional dataset distillation approach 450 can be seen in FIG. 4. In the conventional dataset distillation 450, the main algorithm may run for T training steps and may involve four computations, namely, distilled dataset initialization 452, model optimization 454, distillation gradient computation 456, and distillation optimization 458. The table 500 in FIG. 5 discloses the elements and data that may be involved in the computations of the method 450.

The method 400 may be performed at each of one or more edge nodes, and may begin by initializing 402 a distilled dataset of the edge node, choosing a size M and dimensionality D for the distilled dataset. The distilled dataset and a distillation learning rate, along with a model distribution for initialization, may then be communicated 404 from the central node to the edge nodes. The model optimization operation 406 may start with one or more initialized models $\theta_i$ and optimize those models on the current distilled dataset $\tilde{x}$. The result of this optimization 406 is a model trained on the distilled data. The optimized model may then be used in the next operation, which may be a distillation loss computation 408 on the real data $L_i$, that is, the actual dataset from which the distilled dataset is to be obtained. After computing the distillation loss 408, the method 400 may then optimize the distilled dataset by performing a distillation loss gradient compression 410 operation with the aggregated distillation losses from each optimized model. As part of the operation 410, or separately, the method 400 may also perform an operation to learn the learning rate $\tilde{\eta}$. The distillation loss and learning rate gradient operations may be performed using the gradients $\nabla_{\tilde{x}} L_i$ and $\nabla_{\tilde{\eta}} L_i$, which may then be communicated 412 by the edge nodes to the central node. The gradients may be aggregated 412 at the central node, and data distillation 414 may be performed based on the aggregated gradients.

An example algorithm 600 corresponding to the method 400 is disclosed in FIG. 6. It is noted that the algorithm 600 may enable the model optimization and distillation loss computation operations to be performed in a distributed manner, for example, at the edge, specifically, edge nodes. Such an approach may imply, for example, a need for additional communications and further operations. Such communications may be, for example, (1) the central node sending the distilled dataset $\tilde{x}$, the learning rate $\tilde{\eta}$, and the model initialization distribution $p(\theta)$ to each edge node, and (2) the edge nodes sending back their gradients $\nabla_{[<]}$ BEGINITALmxL$_i$, $\nabla_{\tilde{\eta}} L_i$, which may be compressed, to the central node for computed distillation losses.

It is noted that both of these operations (1) and (2) may satisfy the strong requirements imposed by one example domain, namely, privacy of the data, and low communication costs. Particularly, the distilled dataset may not be reversible, even if the other parameters, such as the model initialization distribution $p(\theta)$ for example, are known. This means that the experiences of the edge nodes, and their respective data streams, may not be able to be inferred without prior knowledge. The gradients, sent from the edge nodes to the central node, may also provide privacy guarantees under some scenarios. Secondly, both the distilled datasets, sent from the edge nodes to the central node, as well as the gradients may be much smaller than the data samples from the edge nodes data streams, for any non-trivial number of edge nodes.

The further operations referred to earlier may be, for example, (1) gradient compression performed at each edge node prior to communication to the central node, and (2) the gradient decompression and aggregation performed at the central node. These communications and operations may be performed at each training operation of the overall dataset distillation process.

At a high level then, the operations of the algorithm may be as follows:
1. Central node starts with an initial distilled dataset;
2. Central node communicates to all edge nodes the triplet $(\tilde{x}\text{-}\tilde{\eta}\text{-}p(\theta))$:
   a. $\tilde{x}$: the current distilled dataset;
   b. $\tilde{\eta}$: the current learning rate; and
   c. $p(\theta)$: distribution used for model initialization
3. Each edge node then:
   a. Optimizes the model on the distilled dataset;
   b. Calculates the loss on its own private data;
   c. Obtains gradients for the distilled dataset and learning rate;
   d. Compresses gradients; and
   e. Communicates the compressed gradients $\nabla_{\tilde{x}} L_i$, $\nabla_{\tilde{\eta}} L_i$
4. Central node decompresses gradients
5. Central node aggregates the gradients
6. Central node updates the distilled dataset and the learning rate
7. Repeats for T training steps Each edge node may receive a model initialization distribution $p(\theta)$ that determines the model to be optimized in operation 3.a above. The compression of the gradients by each edge node, operation 3.d above, may comprise any practical approach for gradient compression. Applying gradient compression may further diminish the communication costs in FL approaches. The chosen compression scheme may also impact operation 4, determining the decompression scheme that corresponds to the compression in operation 3.d. Finally, FL approaches may apply different gradient aggregation procedures.

C. Further Aspects of Some Example Embodiments

Example embodiments may be directed to a framework, in the form of a decision support system, for determining the appropriate dataset distillation method to be applied in distributed environments for a given use case. An overarching method may be provided that allows an expert to select the best method to be applied for a given context, thus adding value and increasing the productivity of as-a-service offering of edge model training and distribution. Embodiments of the invention may embrace, among other things, the mapping of context, such as environment restrictions and trade-offs for example, to methods and protocols that aim at efficiently deploying models to edge nodes that are able to perform dataset distillation. Thus, example embodiments may two particular aspects, namely, (i) a decision process, for decision support systems, relying on a catalogue mapping environment restrictions and trade-offs to different dataset distillation methods and protocols, and (ii) a data set distillation algorithm pertinent to specific use cases.

In more detail, example embodiments may define a framework for mapping environment restrictions to choices of dataset distillation methods. This may ultimately provide a decision process to determine which approach to apply in each scenario, depending on resource availability and other domain requirements such as privacy guarantees. Note that in the following discussion, as elsewhere herein, a distinction may be drawn between a central node and an edge node. This central node may comprise a near edge, core, or cloud computation environment. In certain configurations, one of the edge nodes may be selected to operate as the central node. However, in some embodiments at least, there may be an implicit assumption that the central node possesses significant computational resources and is capable of performing all operations of a dataset distillation process, while in other embodiments, at least part of a dataset distillation process may be performed at one or more edge nodes. That is, each of one or more edge nodes may perform a portion of a respective dataset distillation process concerning data received and/or generated by that edge node.

C. Abstract Dataset Distillation

Figures 7, 8:
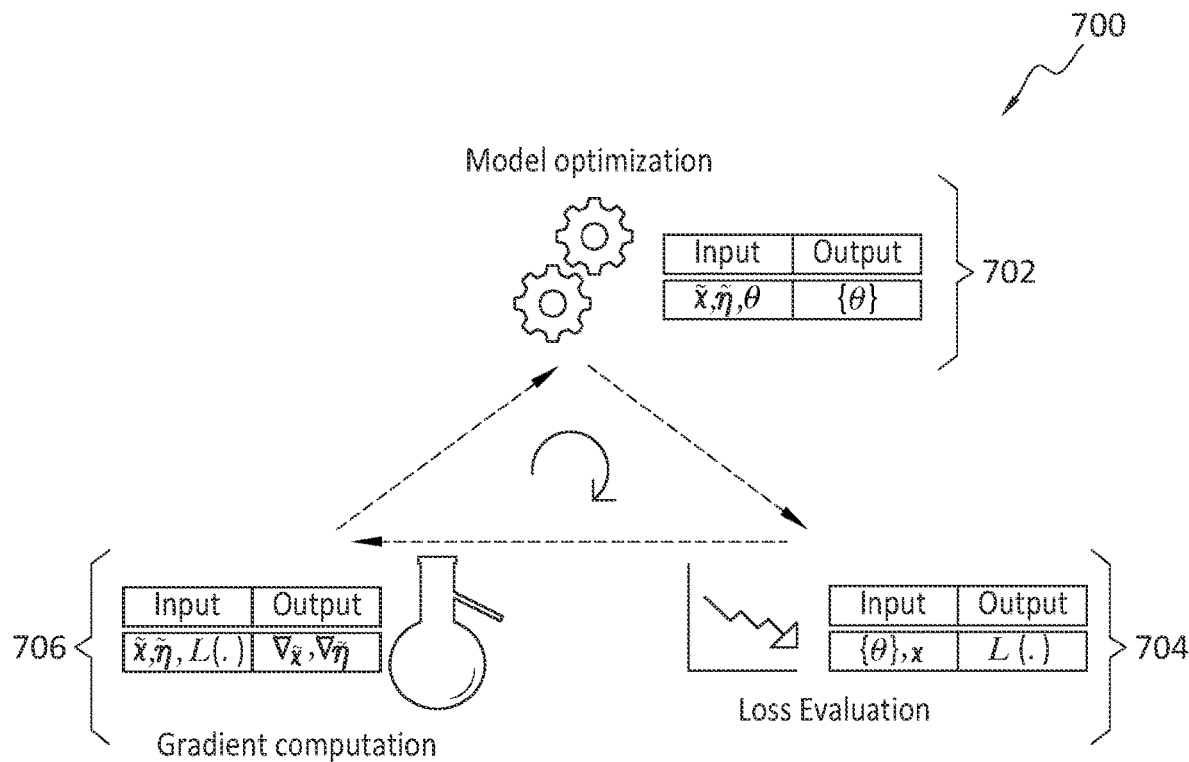
FIG. 7 discloses a high level view of a dataset distillation process.
FIG. 8 discloses a table with a summary of method names mapped to communication requirements.

With reference next to FIG. 7, an example dataset distillation algorithm 700 is disclosed. As shown, the algorithm 700 may comprise three primary operations. These are model optimization 702 (with respect to the current distilled data), loss evaluation 704 (with respect to the original data and optimized model), and gradient computation 706 (with respect to the distilled data and learning rate). Depending upon the embodiment, any one or more of 702, 704, and 706, may be performed at an edge node, or multiple edge nodes, or at a central node. In general, the operations 702, 704, and 706 may be performed in a closed loop for a given number of iterations T.

C.1 Model Optimization $$\theta_i \sim p(\theta)$$

for $e=1$ to $E$ do $$\theta_i \leftarrow -\tilde{\eta} \nabla_{\theta_i} \ell(\tilde{x}, \theta_i)$$

This operation may involve optimizing a model for a set of distilled data. At first, it may start with random data but, in further calls, may be dealing with the current optimized distilled data. This model may be optimized on the distilled data so that it can later be seen how well it performs on real data during the next operation of loss gradient optimization. The model optimization process may require enough resources to sample a model using a random seed and an initialization function, and performing many iterations of model optimization. Since model optimization may exceed model initialization in terms of computational resource requirements, the model optimization operation may, in some embodiments, only be performed in nodes with the resources available to optimize models.

Model optimization may require access to $\tilde{x}$, $\tilde{\eta}$, $\theta$: the distilled data $\tilde{x}$; the distillation learning rate $\tilde{\eta}$; and a model $\theta$. The distilled data $\tilde{x}$ may change at every overarching iteration $t \in T$ and thus may need to be kept up to date. That is, if many nodes are each optimizing their own models, those nodes may need to refer to a same, or common, distilled dataset $\tilde{x}$. As well, the model may also be compactly represented by a random seed and an initialization function $p(\theta)$, since it is volatile in the sense that there may only be a need to create the model for the model optimization, after which the model may be deleted. The result of the model optimization may be a model that is optimized on the distilled data.

C.2 Loss Evaluation $$L^{(j)} = l(x, \theta^{(j)})$$

In the loss evaluation operation, an evaluation may be performed of the losses $L^{(j)}$ of a set of models $\theta^{(j)}$ on the real training data xt. As such, the loss evaluation operation may need access to various data and information, namely: (i) the loss function l(.); (ii) the real training data xt; and, (iii) a set of optimized models $\theta^{(j)}$. The optimized models are those obtained by optimizing on the distilled data. The real training data may be stored at a central node or at the edge, which may depend on the distillation method being run.

Note that reference may be made herein to a set of optimized models because edge nodes may be used to optimize different models in parallel, so that distillation is robust to initializations, or there may be a set of models being optimized centrally. Whether optimization is performed on the edge, or centrally, may again depend on context restrictions that leads to a choice between one or another distillation method.

In terms of computation requirements for the loss evaluation operation, embodiments may need to be able to perform a forward pass for the entire training data, for each model. This could be done on CPU-only nodes, but if the training data is high-dimensional and there are many samples, this might become prohibitive and accelerators such as GPUs may be needed to handle the processing load. The result of the loss evaluation operation may be a set of loss values for each optimized model run on the entire training data.

C.3 Gradient Computation $$\nabla_{\tilde{x}}(\Sigma_j L^{(j)}); \nabla_{\tilde{\eta}}(\Sigma_j L^{(j)})$$

The final operation in this example dataset distillation method is the computation of the gradient of the loss with respect to the distilled data $\nabla x$ and learning rate $\nabla \tilde{\eta}$. This operation may require access to: (1) the learning rate; (2) the distilled data; (3) the loss function; and (4) the set of loss values, obtained as noted earlier. In terms of computation, this operation of computing the gradient of the loss may require the presence of accelerators to perform the computation required for the gradients, especially if the distilled data is high-dimensional and/or has a large number of samples. The result of the gradient computation operation is the two gradients of the loss with regard to, respectively, the distilled data $\nabla x$ and learning rate $\nabla \tilde{\eta}$.

C. Further Aspects of Dataset Distillation

In terms of access requirements, each dataset distillation operation may requires the following elements:
  Model Optimization (distilled data); requires $\tilde{x}$, $\tilde{\eta}$, $\theta$
  Loss evaluation (real data)—requires x, $\theta$, L
  Gradient computation—requires $\tilde{x}$, $\tilde{\eta}$, $\theta$, L
The table 800 in FIG. 8 discloses a mapping of dataset distillation methods to required communications between central and edge nodes, that is, their required data exchange. Thus, the last two columns in the table 800 present the required data exchange from central to edge nodes. For the dataset distillation method names, this disclosure employs a three-letter naming scheme, one example of which is EEC. The first letter stands for where the model training (optimization) occurs; the second letter, for where the loss evaluation is performed; and the third letter, for where the gradient computation occurs. Thus, in the case of EEC, the method is a form of "federated distillation," where edge nodes are used in federation for optimization (first 'E'), the loss is computed at the edge so as to keep the data private (second 'E'), and the distillation is performed at the central node because edge nodes are resource-constrained (last letter 'C'). In the next subsection, a discussion is presented of each of the possible methods according to the constraint combination (where Dataset Distillation is referred to with the abbreviation DD in the method names).

C.1 ECE: Distributed DD

This method accounts for no constraints, that is, a large number of nodes may be allowed, data need not be kept private, and there are no resource constraints at the edge. In this case, edge nodes are leveraged for data collection and optimization, but data can be sent to a central node for performing the loss evaluation, if this required, for other reasons. This approach may typically be subsumed by the full Federated DD approach if privacy concerns are not imposed.

C.2 ECC: Distributed Harvest DD

In this case, edge nodes may be used to harvest data collection and to perform the model optimization step, but other optimizations are done centrally. The nodes may not be excessively constrained with respect to computational resources, although some constraints are acceptable. This scenario may also require communication of, among other things, the ground truth data from the edges to the central node and, therefore, cannot be applied in scenarios in which the data must be kept private to the edge nodes.

C.3 EEE: Federated DD

This method may be constrained only by the data needing to be kept private. In this case, edge nodes may be leveraged for data collection and optimization, but the data may be sent to a central node if required for other reasons. This approach may comprise the algorithm described in the discussion at B.3 concerning federated dataset distillation.

C.4 EEC: Resource-Constrained Distributed Federated DD

This is a sub-case of federated DD, in which there may be some constraints on the available resources at the edge. Thus, this approach may additionally require communicating $\nabla_{\tilde{x}} Li$, $\nabla_{\eta} Li$ from the edge to the central node, and performance of the gradient computation centrally.

C.5 CCE: Decentralized DD

This method may be similar to Distributed DD at C.1, but here there may be a limit in the number of edge nodes available. In this case, the gradient computation can be done at the edge in case there is a need to incorporate more distilled data available at the edge.

C.6 CCC: Harvest DD

This method may be constrained in terms of resources available at the edge. In this case, edge nodes may be used to harvest data collection, but all optimizations are done centrally.

C.7 CEE: Decentralized Federated DD

Similar to Decentralized DD at C.5, but the data is kept at the edge to preserve privacy.

C.8 CEC: Resource-Constrained Decentralized Federated DD

In this method, there are constraints for optimization at the edge and for keeping the data private. Similar to EEC, this approach comprises a transfer of $\nabla_{\tilde{x}} Li$, $\nabla_{\eta} Li$ from the edge to the central node. An example algorithm 900 for CEC is disclosed in FIG. 9. It is noted that for the other approaches indicated in the table 800, respective algorithms may be derived from the general formulation discussed in connection with FIG. 8, and the descriptions of the constraints described elsewhere herein.

D. Aspects of an Example Model Selection Process

Figure 10:
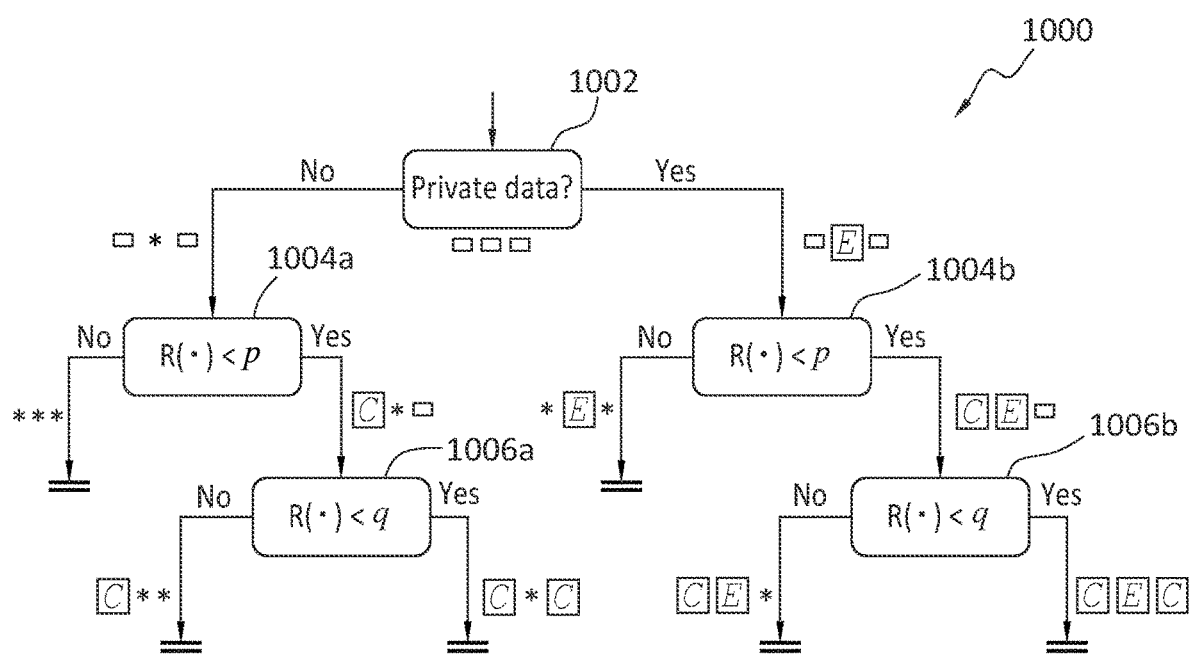
FIG. 10 discloses a decision chart that maps restrictions to possible methods.

In this section is presented a decision support system for choosing the best method according to environmental restrictions. The example decision support system focuses on three primary restrictions: data privacy; medium resources available at the edge; and, low resources available at the edge. FIG. 10 discloses an example decision tree 1000 for the aforementioned restrictions, and indicates the mapping of restrictions to various possible data distillation methods.

Particularly, and with continued reference to the example of FIG. 10, recall the three-letter scheme introduced above and referenced in the following subsections. Each decision in the decision tree 1000 may determine where, either at the edge E, or central node C, one of the three operations of a dataset distillation method should take place. If a decision determines that the process may be performed at either C or E, the symbol * is used. The symbol □ stands for an unknown restriction for that process—thus, the symbol □□□ at the root node for when no decisions have been considered.

In the example of FIG. 10, the first decision 1002 may be made with respect to the privacy requirements that may be associated with the data from which a distilled dataset is to be derived. Given the nature of the communications between the different approaches, the decision 1002 may be assumed, in some embodiments at least, to be a Boolean decision factor. That is, at 1002, a decision is made that the data is either considered to be private, or not private. Subsequent decisions in the decision tree 1000 may then be made based upon this initial determination.

The following decisions may be made with respect to the availability of resources. In particular, some embodiments may assume two domain-defined threshold levels p and q, such that q determines a most-strict requirement (q≤p). Assuming a domain-defined function R that can determine the available resources for the dataset distillation process at the edge, three cases may be considered—if the level of resources is high enough to account for both thresholds, that is, R(•)<p 1004a/b evaluates to 'No,' both the model optimization and gradient computation operations may be allowed to be performed at either the central C or edge E node. If the level of resources is intermediate, that is, R(•)<p 1004a/b evaluates to 'Yes' and R(•)<q 1006a/b evaluates to 'No', the model optimization, but not necessarily the gradient computation, may be constrained to the central node. Finally, if the level of resources is most restricted, both the model optimization and the gradient computation may be constrained to the central node. Note, in the example of FIG. 10, that the 'a' references indicate decisions and evaluations made if the data is determined 1002 to not be private, and the 'b' references indicate decisions and evaluations made if the data is determined 1002 to be private. Thus, the decision tree 1000 embodies a decision process that can be used in tandem with any additional decision processes for determining the appropriate approach for dataset distillation in a distributed environment.

E. Further Discussion

As will be apparent from this disclosure, example embodiments may provide various useful aspects and features. As noted, example embodiments may rest on the mapping of context, such as environmental restrictions and various tradeoffs, to methods and protocols that aim at efficiently deploy models to edge nodes with dataset distillation. Thus, example embodiments may enable a decision support system mapping environment restrictions and tradeoffs to different dataset distillation methods and protocol. As another example, some embodiments may provide a data set distillation algorithm pertinent to various use cases. Particularly, example embodiments embrace a resource-constrained decentralized federated dataset distillation algorithm, which figures as one of the approaches considered by decision processes, one example of which is disclosed in FIG. 10, discussed above.

F. Example Methods

It is noted with respect to the example methods disclosed herein that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

G. Further Example Embodiments

Following are some further example embodiments of the invention. These are presented only by way of example and are not intended to limit the scope of the invention in any way.

Embodiment 1. A method, comprising: mapping a set of environment constraints to elements of a dataset distillation process; and performing the dataset distillation process based upon the mapping, and the dataset distillation process is performed in a distributed manner by a group of edge nodes and a central node with which the edge nodes communicate.

Embodiment 2. The method as recited in embodiment 1, wherein the dataset distillation process comprises the operations: optimizing a machine learning model, using a current set of distilled data, to define an optimized machine learning model; performing a loss evaluation process with respect to original data from which the distilled data was obtained, and with respect to the optimized machine learning model; and performing a gradient computation with respect to the distilled data and a learning rate of the optimized machine learning model.

Embodiment 3. The method as recited in embodiment 2, wherein each of the operations of the dataset distillation process is performed either at one of the edge nodes, or at the central node.

Embodiment 4. The method as recited in any of embodiments 1-3, wherein one of the environment constraints is data privacy.

Embodiment 5. The method as recited in any of embodiments 1-4, wherein one of the environment constraints is an availability of a computing resource at one or more of the edge nodes.

Embodiment 6. The method as recited in any of embodiments 1-5, wherein the dataset includes data that was received and/or generated at the edge nodes.

Embodiment 7. The method as recited in any of embodiments 1-6, wherein no private data is transmitted from any of the edge nodes.

Embodiment 8. The method as recited in any of embodiments 1-7, wherein the mapping determines those communications, that are part of the dataset distillation process, that will be transmitted from one or more of the edge nodes to the central node, and those communications, that are part of the dataset distillation process, that will be transmitted from the central node to one or more of the edge nodes.

Embodiment 9. The method as recited in embodiment 8, wherein a direction of communications to/from one of the edge nodes and to/from the central node is determined based upon the set of environment constraints.

Embodiment 10. The method as recited in any of embodiments 1-9, further comprising automatically performing a remapping process in response to a change regarding one or more of the environment constraints.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
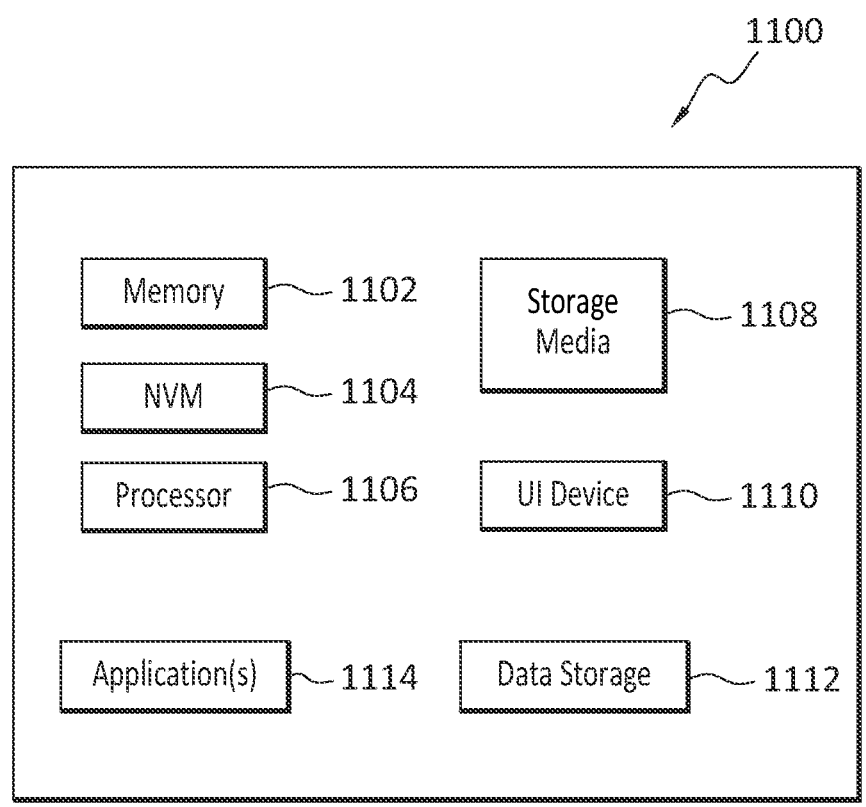
FIG. 11 discloses an example computing entity operable to perform any of the disclosed methods, processes, steps, and operations.

With reference briefly now to FIG. 11, any one or more of the entities disclosed, or implied, by FIGS. 1-10 and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 10.

In the example of FIG. 10, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1106 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
mapping a set of environment constraints to a dataset distillation process; and
performing the dataset distillation process based upon the mapping in a distributed manner by a group of edge nodes and a central node with which the edge nodes communicate,
wherein the dataset distillation process comprises operations including:
transmitting, from the central node to each of the edge nodes, a current set of distilled data;
optimizing, at each of the edge nodes, a machine learning model, using the current set of distilled data, to define an optimized machine learning model;
receiving, by the central node from each of the edge nodes, a respective updated distillation loss, where the updated distillation loss was generated by a loss evaluation process performed at the edge node with respect to original data from which the distilled data was obtained, and with respect to the optimized machine learning model;
receiving, by the central node from each of the edge nodes, a respective updated learning rate that was obtained by the edge node using a gradient computation with respect to the distilled data and a current learning rate of the optimized machine learning model;
aggregating, by the central node, the updated distillation losses and the updated learning rates received from the edge nodes;
distilling, by the central node, the current set of distilled data into a new set of distilled data based on the aggregated distillation losses and the aggregated learning rates, wherein the new set of distilled data is not transmitted from each of the edge nodes to the central node;
adding a new edge node to the group of edge nodes;
transmitting, from the central node to the new edge node, the new set of distilled data; and
optimizing, at the new edge node, a machine learning model, using the new set of distilled data.

2. The method as recited in claim 1, wherein each of the operations of the dataset distillation process is performed either at one of the edge nodes, or at the central node.

3. The method as recited in claim 1, wherein one of the environment constraints is data privacy.

4. The method as recited in claim 1, wherein one of the environment constraints is an availability of a computing resource at one or more of the edge nodes.

5. The method as recited in claim 1, wherein the dataset includes data that was received and/or generated at the edge nodes.

6. The method as recited in claim 1, wherein no private data is transmitted from any of the edge nodes.

7. The method as recited in claim 1, wherein the mapping determines those communications, that are part of the dataset distillation process, that will be transmitted from one or more of the edge nodes to the central node, and those communications, that are part of the dataset distillation process, that will be transmitted from the central node to one or more of the edge nodes.

8. The method as recited in claim 7, wherein a direction of communications to/from one of the edge nodes and to/from the central node is determined based upon the set of environment constraints.

9. The method as recited in claim 1, further comprising automatically performing a remapping process in response to a change regarding one or more of the environment constraints.

10. A non-transitory computer readable storage medium having stored therein instructions that are executable by one or more hardware processors to perform operations comprising:
  mapping a set of environment constraints to a dataset distillation process; and
  performing the dataset distillation process based upon the mapping in a distributed manner by a group of edge nodes and a central node with which the edge nodes communicate,
  wherein the dataset distillation process comprises operations including:
    transmitting, from the central node to each of the edge nodes, a current set of distilled data;
    optimizing, at each of the edge nodes, a machine learning model, using the current set of distilled data, to define an optimized machine learning model;
    receiving, by the central node from each of the edge nodes, a respective updated distillation loss, where the updated distillation loss was generated by a loss evaluation process performed at the edge node with respect to original data from which the distilled data was obtained, and with respect to the optimized machine learning model;
    receiving, by the central node from each of the edge nodes, a respective updated learning rate that was obtained by the edge node using a gradient computation with respect to the distilled data and a current learning rate of the optimized machine learning model;
    aggregating, by the central node, the updated distillation losses and the updated learning rates received from the edge nodes;
    distilling, by the central node, the current set of distilled data into a new set of distilled data based on the aggregated distillation losses and the aggregated learning rates, wherein the new set of distilled data is not transmitted from each of the edge nodes to the central node;
    adding a new edge node to the group of edge nodes;
    transmitting, from the central node to the new edge node, the new set of distilled data; and
    optimizing, at the new edge node, a machine learning model, using the new set of distilled data.

11. The non-transitory computer readable storage medium as recited in claim 10, wherein each of the operations of the dataset distillation process is performed either at one of the edge nodes, or at the central node.

12. The non-transitory computer readable storage medium as recited in claim 10, wherein one of the environment constraints is data privacy.

13. The non-transitory computer readable storage medium as recited in claim 10, wherein one of the environment constraints is an availability of a computing resource at one or more of the edge nodes.

14. The non-transitory computer readable storage medium as recited in claim 10, wherein the dataset includes data that was received and/or generated at the edge nodes.

15. The non-transitory computer readable storage medium as recited in claim 10, wherein no private data is transmitted from any of the edge nodes.

16. The non-transitory computer readable storage medium as recited in claim 10, wherein the mapping determines those communications, that are part of the dataset distillation process, that will be transmitted from one or more of the edge nodes to the central node, and those communications, that are part of the dataset distillation process, that will be transmitted from the central node to one or more of the edge nodes.

17. The non-transitory computer readable storage medium as recited in claim 16, wherein a direction of communications to/from one of the edge nodes and to/from the central node is determined based upon the set of environment constraints.

18. The non-transitory computer readable storage medium as recited in claim 10, further comprising automatically performing a remapping process in response to a change regarding one or more of the environment constraints.

* * * * *